United States Patent [19]
Black, Jr. et al.

[11] 3,751,127
[45] Aug. 7, 1973

[54] MODULAR INSTRUMENT HOUSING

[75] Inventors: David V. C. Black, Jr., Palo Alto; Richard E. Pospisil; George A. Powell, both of Los Altos, all of Calif.

[73] Assignee: Telecommunication Technology, Inc., Sunnyvale, Calif.

[22] Filed: Sept. 10, 1970
(Under Rule 47)

[21] Appl. No.: 71,069

[52] U.S. Cl. .............................................. 312/111
[51] Int. Cl. ............................................ F16b 12/00
[58] Field of Search ................... 312/211, 140, 257; 46/26

[56] References Cited
UNITED STATES PATENTS

| | | | |
|---|---|---|---|
| 1,076,116 | 10/1913 | Hatfield | 312/111 |
| 2,956,705 | 10/1960 | Clingman | 312/140 X |
| 3,150,903 | 9/1964 | Chapman et al. | 312/257 SK |
| 3,265,935 | 8/1966 | Rosa | 312/111 X |
| 3,477,182 | 11/1969 | Fulton | 312/140 X |
| 3,661,434 | 5/1972 | Alster | 312/257 R |
| 3,279,875 | 10/1966 | De Witte | 312/320 |
| 3,288,319 | 11/1961 | Cahill | 312/108 |
| 3,032,919 | 5/1962 | Amsler | 46/26 |
| 3,093,568 | 6/1963 | Cox | 46/26 X |

FOREIGN PATENTS OR APPLICATIONS 92,181  11/1961  Denmark ........................ 312/111

Primary Examiner—Paul R. Gilliam
Attorney—Limbach, Limbach & Sutton

[57] ABSTRACT

A modular instrument housing is formed from universal elongated corner edge members by use of combining members which are adaptable within combining member slots located along the length of the corner members. Panel receiving slots are also provided in the corner members for inserting panels to form the housing module surfaces. A single instrument housing can be formed of a plurality of modules can be combined together to form a composite instrument housing.

18 Claims, 8 Drawing Figures

INVENTORS
GEORGE A. POWELL
DAVID V.C. BLACK JR.
RICHARD E. POSPISIL

BY Limbach, Limbach and Sutton
ATTORNEYS

PATENTED AUG 7 1973 3,751,127

INVENTORS
GEORGE A. POWELL
DAVID V.C. BLACK JR.
RICHARD E. POSPISIL

BY *Limbach, Limbach and Sutton*
ATTORNEYS

PATENTED AUG 7 1973 3,751,127

INVENTORS
GEORGE A. POWELL
DAVID V.C. BLACK JR.
RICHARD E. POSPISIL
BY Limbach, Limbach and Sutton
ATTORNEYS

MODULAR INSTRUMENT HOUSING

BACKGROUND OF THE INVENTION

The present invention relates to a modular instrument housing, and more particularly to an instrument housing which can be made using a plurality of identical and universal corner members, and which may be assembled to form a composite instrument housing of a desired size and configuration, and which can be taken apart and reassembled into other modular configurations with relative ease.

In fields such as instrument design and manufacturing, instruments are presently sold which can be used and transported individually or can be housed with other similar or dissimilar instruments in a single composite structure. In the latter situation, it is desirable to be able to combine one or more such instruments in a manner which requires few tools and which is simple and quick.

In a like manner it is also desirable to be able to disassemble such a composite structure so that the instrument may be used individually or combined with fewer or more, or different instruments. Similarly, it is desirable to be able to construct a modular instrument housing which can readily and easily be made into a size which is necessary for the particular instrument to be lodged therein.

In U.S. Pat. No. 1,076,116, issued to John Hatfield, a unit filing cabinet is disclosed which makes use of combining or interlocking bars for connecting together rectangular sections or units for use as a filing cabinet. Individual units are combined into a unitary housing comprising a plurality of modules by use of the interlocking bars which slide into a locking relationship with adjacent modules to form the desired cabinet configuration.

The combining or interlocking bars shown therein include a two-ridged bar for combining two such units, as for example where one unit is stacked on top of the other. Additionally, four-ridged interlocking bars or combining members are used where three or four modules are combined.

The interlocking bars cooperate with flanges formed at the corners of each of the modules or units. The flanges are formed by bending extended portions of the side plates making up the individual modules into the desired flange configuration. Since the corner flange portions are an integral part of each of the module units, once a module is constructed, the size or dimension of the module cannot be altered. This limits the possible ways in which individual modules can be combined into a single unitary composite construction.

Furthermore, the corner flanges shown in U.S. Pat. No. 1,076,116 project substantially from the walls of the individual units, thereby tending to waste space between the units.

SUMMARY OF THE INVENTION

According to the present invention, elongated universal corner edge members are provided which are used to form individual instrument housing modules, and may also be used in combination with combining members to form a plurality of modules, unlimited as to size and shape, into a single, composite, unitary structure. The corner members do not form an integral part of the housing surface panels. Rather, the corner members are used as building blocks, to form individual clusters of instrument housings as desired.

Each corner member includes a pair of panel receiving slots located along the length of the corner member. These slots are at substantially right angles to one another. The slots receive panels which form the tops, bottom and sides of each housing, as well as the partitiona within a composite housing structure.

Each corner member also includes a combining member receiving slot located along the length thereof. This slot is used for receiving combining members when it is desired to combine one or more instrument housings. This slot has a cross-sectional configuration such that once the combining member is placed therein, it is impossible for the corner member to be dislodged from the combining member.

The combining members are of two basic types. In the first, two ridges are provided, each ridge having a cross-section corresponding to that of the combining member receiving slot. The two-ridged combining member is used for combining two modules. The second is a four-ridged combining member used for combining three or four modules in a manner which will be seen subsequently.

Extruded rubber corner members are provided for use in the combining member receiving slots whenever such a slot is unfilled, as a result of having no combining extrusion located therein. The rubber corner members are neat in appearance and offer protection to the housing corners.

A rack mounting member having a single ridge with a cross-section corresponding to that of the corner member receiving slot includes a flange portion for use in mounting an instrument housing to a wall or elsewhere. The rack mounting member normally firt into the one of the upper corners of a housing module.

DESCRIPTION OF THE PREFERRED EMBODIMENTS

Figure 1:
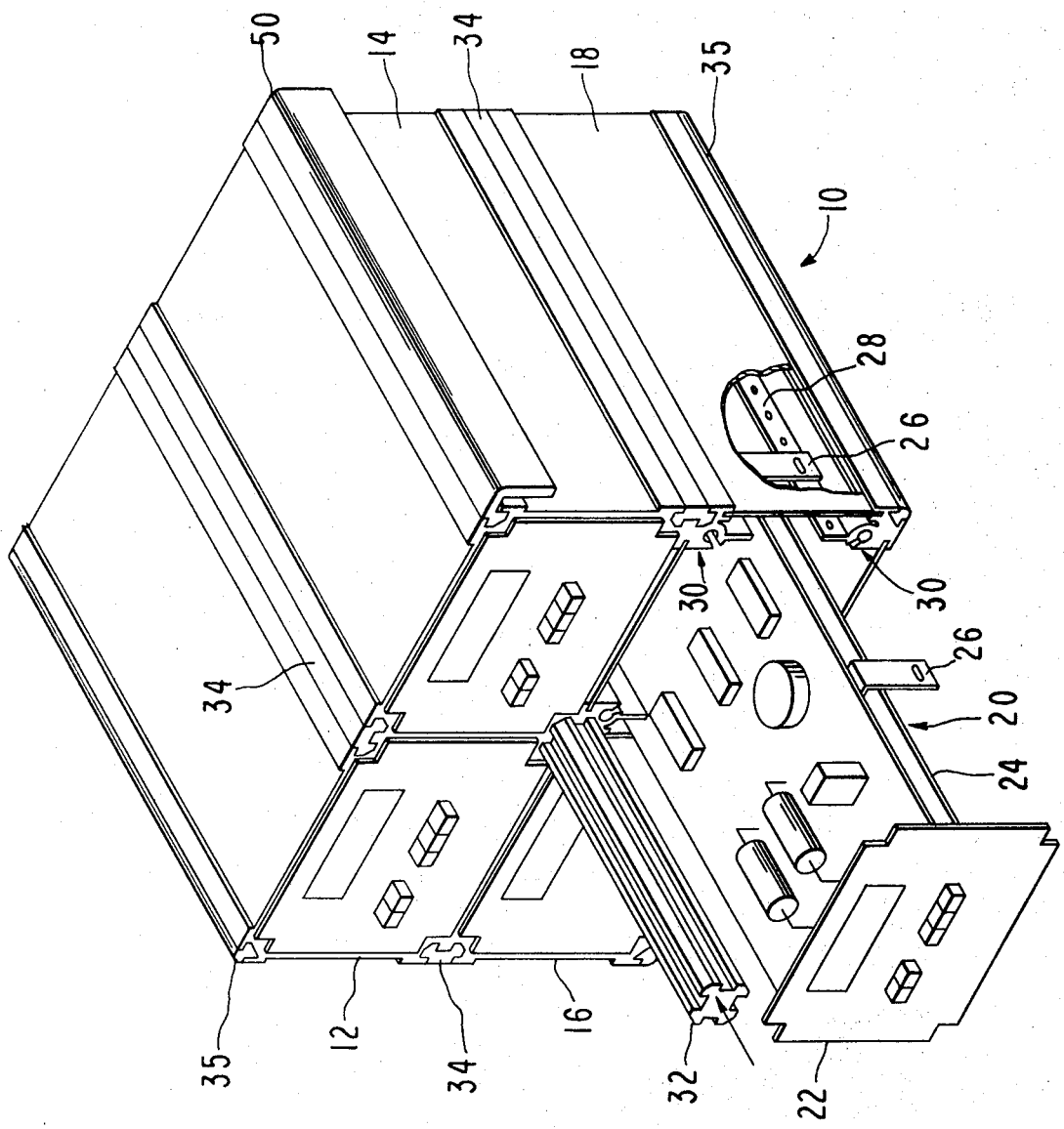
FIG. 1 is a perspective and partially exploded view of a composite instrument housing constructed from four individual instrument housing modules made according to the present invention.

In FIG. 1 a composite housing structure 10 is shown comprising four smaller instrument modules 12, 14, 16, and 18. This particular number of modules is only illustrative, and any number of modules of any size may be formed into a single unitary structure 10. Each of the modules 12, 14, 16, and 18 holds individual instrument equipment 20. Each of the instrument equipment 20 includes a front plate 22 and a back plate or casting (not shown) attached to a chassis 24. The chassis 24 can be moved and removed by sliding within each of the instrument modules as illustrated with respect to module 18.

The chassis 24 is slid into place by slide flanges 26 mounted to the chassis 24 which slide over a flange or runner 28 which forms a part of each of the universal corner edge members 30, which will be described in more detail subsequently.

Figure 6:
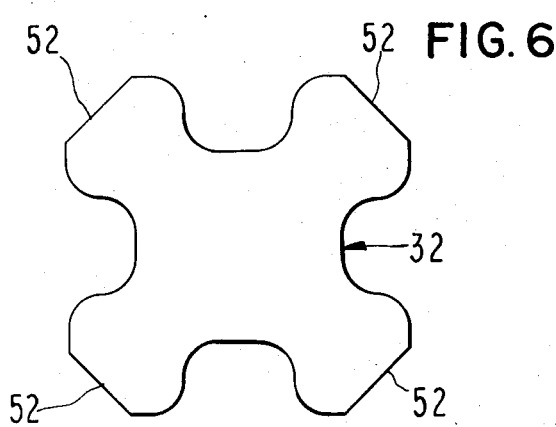
FIG. 6 is an enlarged view of the four-ridged combining member of FIG. 2.

The four modules 12, 14, 16 and 18 are held together in the center of the composite housing 10 by use of a combining or interlocking member 32 having a cross-section illustrated in FIG. 6. For purposes of illustration combining member 32 is shown in a withdrawn position. When assembled the end of combining member 32 is flush with the front of the composite housing 10. The combining member 32 cooperates with corner members 30 of the respective modules 12, 14, 16, and 18 in a manner described in more detail subsequently. For purposes of clarity the relative sizes of the combining member 32 and corner members 30 compared with the composite housing structure 10 as a whole have been exaggerated.

In addition to the four-ridged combining member 32, two-ridged combining members 34 (also exagerated in size) connect modules 12 and 16, 16 and 18, 12 and 14, and 14 and 18. The combining member 34 is similarly slid into an interlocking relationship with the respective modules. The cross-section of the two-ridged combining member 34 is best seen by reference to FIG. 5.

While the composite housing structure 10 has been shown as having four modules of equal size, it should be understood that this number is only illustrative. As will be seen, a composite housing structure according to the present invention may contain more or less modules than shown herein and also may have modules of varying sizes.

Details of the corner members 30 and how they cooperate with the combining member 32 and 34 may best be seen by reference to FIGS. 2, 3, 4, 5, and 6. Each of the corner members 30 (FIG. 3) has a length corresponding to the depth of the desired instrument housing. A pair of panel-receiving slots 40 extend along the length of the corner member 30. These slots 40 are transverse to one another and are adaptable for receiving panels 42 (FIG. 2) which serve as the exterior surfaces of the composite instrument housing 10 as well as the partitions forming individual modules within the composite structure 10.

The side panels 42 may be constructed of a material such as sheet metal or plastic. While for the sake of uniformity and simplicity, the panels 42 may all be constructed of the same material, it may be desirable in some situations, as for example where heavy instruments are enclosed within any of the modules, to use a heavy duty material to form the floors or bottom partitions of the modules. The size of panels 42 is selected to correspond to the size of the particular mdoules desired. Thus, by using four universal corner member 30, an instrument housing of any size may be constructed merely be altering the size of panels 42, and the front and back plates.

Figure 7:
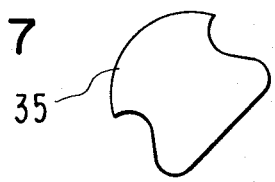
FIG. 7 is an enlarged view of the rubber corner member.

Rubber corner or bumper member extrusions 35 are provided at the exterior corners of composite housing structure 10. A cross-sectional view of the rubber corner extrusion is shown in FIG. 7. The rubber corner extrusions give the housing a neat and attractive appearance, and they serve to protect the corners of the housings from damage.

In addition to the pair of panel receiving slots 40, a central or combining-member receiving slot 44 extends along the length of the elongated corner member 30. It is within the slot 44 that the combining members 32 and 34, and the rubber corner extrusion 35 are slid into place to combine two or more modules into a composite housing structure 10. The combining member receiving slot 44 has a narrow or restricted portion 46 (FIGS. 3 and 4) which forms a smaller opening than the portion 48. The restricted portion 46 prevents dislodging of the combining members once they are in place.

Figure 8:
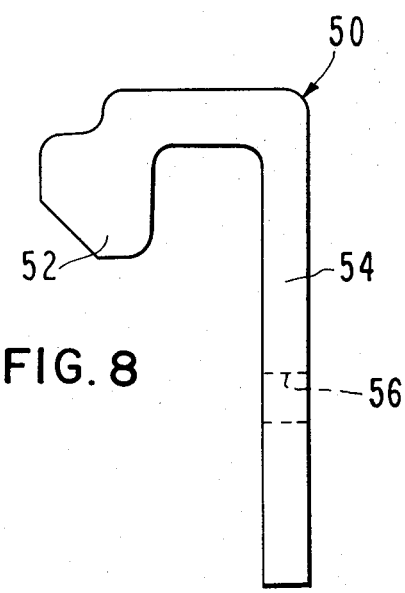
FIG. 8 is an enlarged view of the rack mounting member of FIG. 2.

In addition to the foregoing, the rack mount member 50, shown in detail in FIG. 8, can also be slid within the slot 44. The rack mount member 50 includes a ridge 52 having a cross-section corresponding to that of the slot 44 and includes a flange 54 with at least one mounting bore 56. When the rack mount member 50 is slid in place, the instrument module or composite structure may be easily mounted to a surface.

Figure 2:
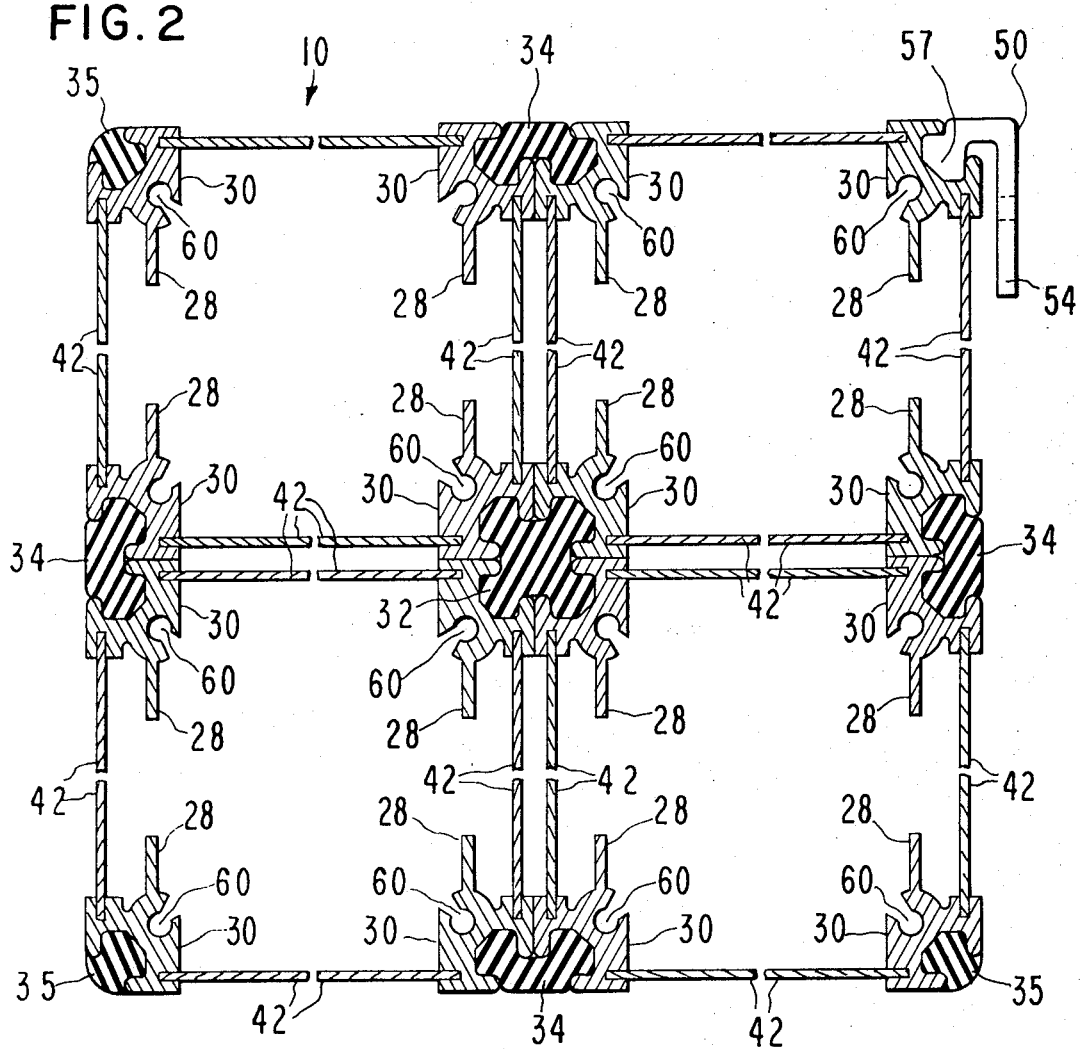
FIG. 2 is a cross-sectional elevational view of the instrument housing shown in FIG. 1.
Figure 3:
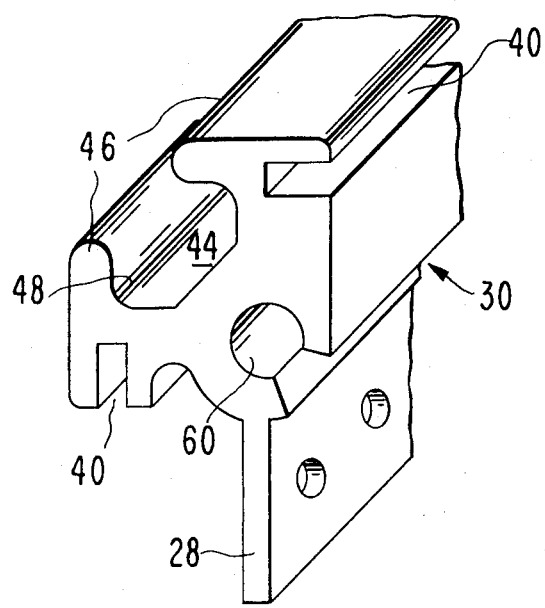
FIG. 3 is a perspective view of an individual corner member in accordance with the present invention.
Figure 4:
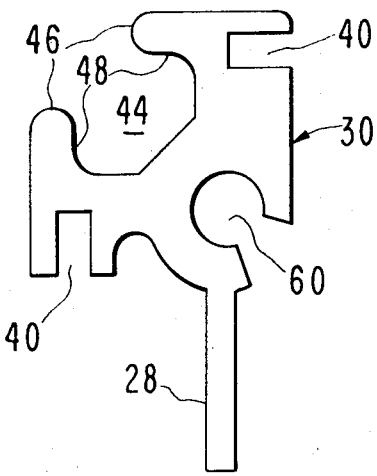
FIG. 4 is an enlarged view of the edge corner member of FIG. 2.
Figure 5:
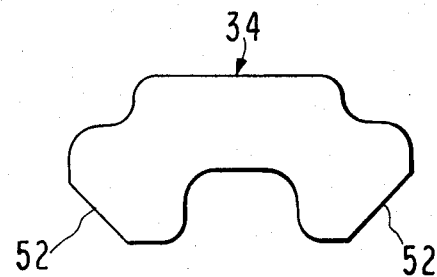
FIG. 5 is an enlarged view of the two-ridged combining member of FIG. 2.

Details of the combining member 34 can be seen by reference to FIGS. 2 and 5. Combining member 34 includes two ridged portions 52 which have a cross-section corresponding to the cross-section of the combining member receiving slot 44. When the combining member 34 is slid within the combining member receiving slot 44 of two corner members 30, two modules, such as modules 10 and 14 may be combined together into a unitary composite structure. Because the corner member 30 includes the restricted portion 46, the corner member 30 is effectively locked with the combining member 34 and cannot be dislodged unless the combining member 34 is slidably removed.

In a like manner, the four-ridged combining member 32, shown in detail in FIGS. 2 and 6, is used to combine three or four corner members 30. Located axially within the corner member 30 is a bore 60 which may be threaded along a portion at both ends thereof. The threaded bore 60 can be used for securing end plates as well as the front plates 22 of the instrument equipment 20 to the modules or composite housing structure. It is simply a matter of providing an oppositely disposed hole in the end or front plates and securing the same to the housing by the use, for example, of a simple screw.

In the preferred embodiment of the present invention the corner member 30, the combining members 32 and 34 and the rack mount extrusion 50 are made of metal such as aluminum by extrusion techniques. While it is deemed that making the above members by an extrusion process is the most satisfactory for the present invention, the invention should not be so limited, for other manufacturing techniques could be employed such as machining the members. Likewise, the above members need not be made of metal, but could, for example, be made of other materials such as steel or plastic where higher strength or lower cost, respectively, are desired.

To form a module or composition of modules, it is a simple matter of selecting the corner members, sliding the requisite combining members in place and then sliding in the panels which form the partitions, floors and exterior walls and surfaces. To break down and/or change the size or module configuration, the aforedescribed process is simply reversed, the panels and combining members are slidably removed and rearranged according to the dictates of the user.

The present invention provides great flexibility in the design and installation of instrument housing modules and composite structures made from a plurality of smaller individual modules. By combining universal corner members into individual or composite modules one can easily construct an instrument housing package according to the particular instruments being housed.

Since the corner members are independent of and do not form a part of the partitions or surfaces of the housing, the housing size is simply a function of the size of the panels used. Furthermore, if it is desirable to reduce or increase the size of a given module or composite structure, all that is necessary is to slidably remove the existing panels and front and back end plates and replace these with the size of panels and end plates necessary, and, if necessary, to rearrange the corner members and/or combining members to form the desired instrument housing. The latter may be done quite simply, even by a non-skilled person.

While one specific embodiment of the invention has been illustrated and described in detail herein, it is obvious that many modifications thereof may be made without departing from the spirit of the invention as described in the appended claims.

We claim:

1. A modular instrument housing, comprising:
   a. four elongated universal corner edge members, each of said corner members including
   i. a pair of panel-receiving slots along the length of each of said corner members; each of said slots being located substantially 90° relative to one another,
   ii. a combining-member receiving slot located along the length of each of said corner members and having a cross-section wherein at least a part of a portion of said combining-member slot is narrower in width than at least a portion of an inner part of said slot, and
   iii. integral additional means for mounting instruments thereto; and
   b. four removable panels, opposite edges of which are adaptable for inserting within said panel receiving slots of said corner members to form the surfaces of said modular instrument housing.

2. A modular instrument housing as in claim 1 wherein said corner members additionally include means for mounting end panels thereto.

3. A modular instrument housing as in claim 2 wherein said end panel mounting means includes a bore located along at least a portion of each of said elongated corner members.

4. A modular instrument housing as in claim 1 wherein said instrument mounting means comprises a mounting flange along the length of each of said corner members.

5. A modular instrument housing as in claim 4 wherein said flange is adaptable as a runner for slidably receiving an instrument chassis.

6. A modular instrument housing as in claim 4 including four elongated rubber corner extrusions each having a cross-section corresponding to those of said combining member receiving slots and each slidably secured therein.

7. Modular instrument housing as in claim 1 including a rack mount member, said rack mount member including a ridge portion having a cross-section corresponding to that of said combining-member receiving slot and including a mounting flange member.

8. A modular instrument housing as in claim 1 wherein said universal corner edge members are formed by an extrusion process.

9. A composite instrument housing, formed from a plurality of smaller individual modules comprising:
   a. a plurality of elongated universal corner edge members each of said corner members including
   i. a pair of panel-receiving slots along the length of each of said corner members,
   ii. a combining-member receiving slot located along the length of each of said corner members and having a cross-section wherein at least a part of an outer portion of said combining-member slot is narrower in width than at least a portion of an inner part of said slot, and
   iii. integral additional means for mounting instruments thereto; and
   b. a plurality of removable elongated combining members adaptable with said combining-member receiving slots for combining from two to four of said corner members into the desired modular configuration; and
   c. a plurality of removable panels, opposite edges of which are adaptable for inserting within said panel receiving slots of said corner members to form the exterior surfaces and interior partitions of said composite modular instrument housing.

10. A composite instrument housing as in claim 9 wherein said corner members additionally include means for mounting end panels thereto.

11. A composite instrument housing as in claim 10 wherein said end panel mounting means includes a threaded bore located along at least a portion of each of said elongated corner members.

12. A composite instrument housing as in claim 9 wherein said instrument mounting means comprises a mounting flange along the length of each of said corner members.

13. A composite instrument housing as in claim 12 wherein said flange is adaptable as a runner for slidably receiving an instrument chassis.

14. A composite instrument housing as in claim 12 including elongated rubber corner extrusions each having cross-sections corresponding to those of said combining-member receiving slots and slidably secured therein in the absence of one of said combining members in an exterior corner of said composite housing.

15. A composite instrument housing as in claim 9 wherein said combining members comprise two-ridge members for combining two corner members and four-ridged members for combining three or four corner members; each of said ridges having a cross-section corresponding to that of said combining-member receiving slot.

16. A composite instrument housing as in claim 9 including a rack mount member, said rack mount member including a ridge portion having a cross-section corresponding to that of said combining-member receiving slot and including a mounting flange member.

17. A composite instrument housing as in claim 9 wherein said universal corner edge members are formed by an extrusion process.

18. A composite instrument housing as in claim 9 wherein said combining members are made from an extrusion process.

* * * * *